Figures 1, 2:
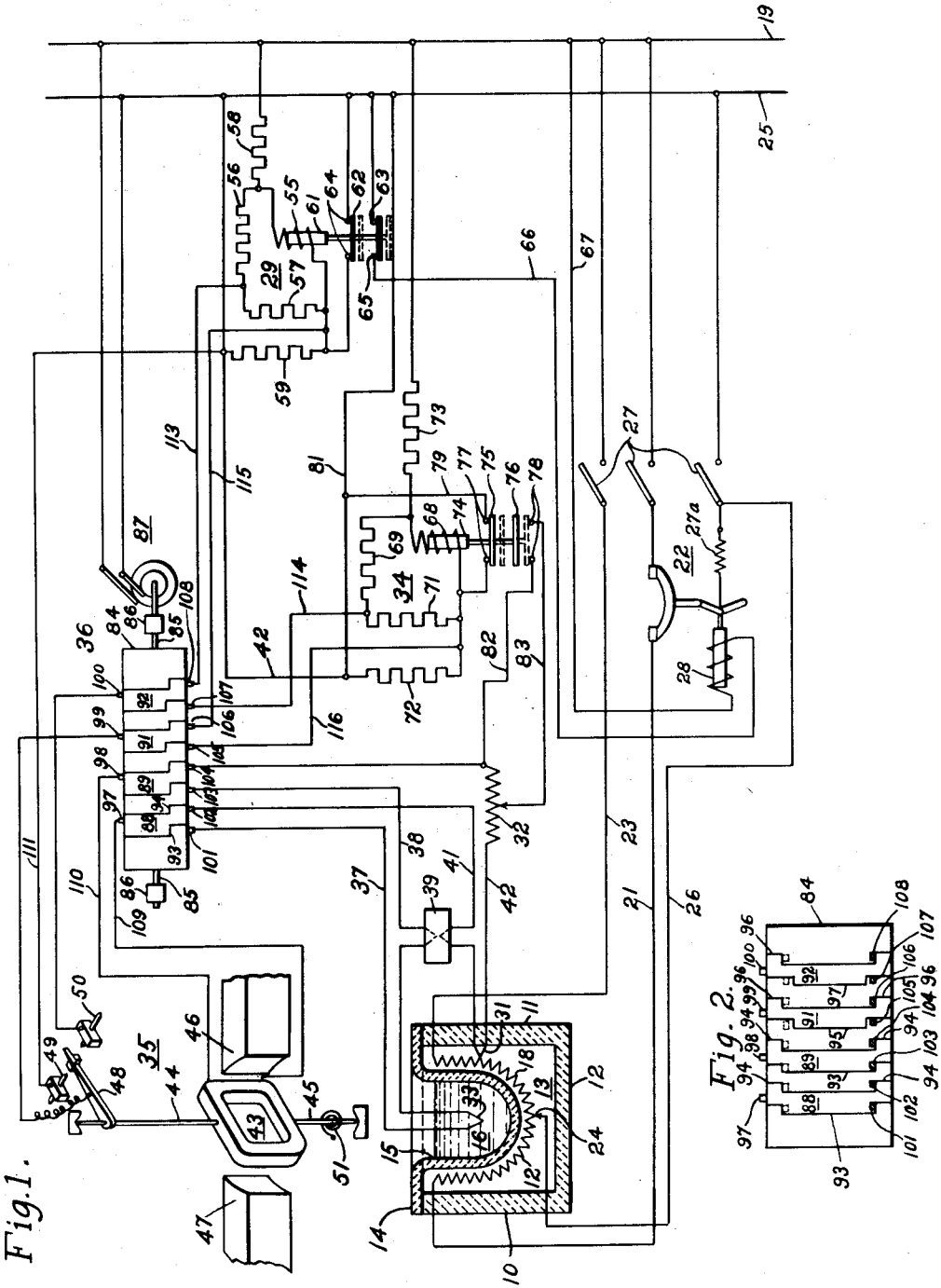

Dec. 18, 1928.

R. B. LINCOLN 1,695,853

TEMPERATURE CONTROL SYSTEM

Filed May 3, 1927    2 Sheets-Sheet 1

WITNESSES:

INVENTOR
Rollo B. Lincoln.
BY
ATTORNEY

Dec. 18, 1928.                                              1,695,853
R. B. LINCOLN
TEMPERATURE CONTROL SYSTEM
Filed May 3, 1927            2 Sheets-Sheet 2
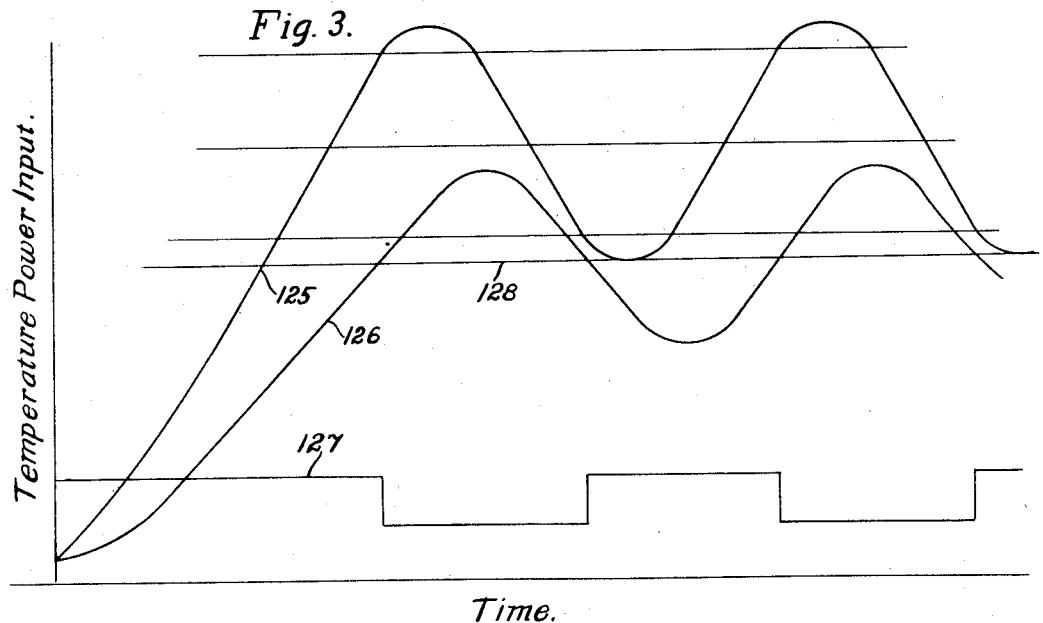
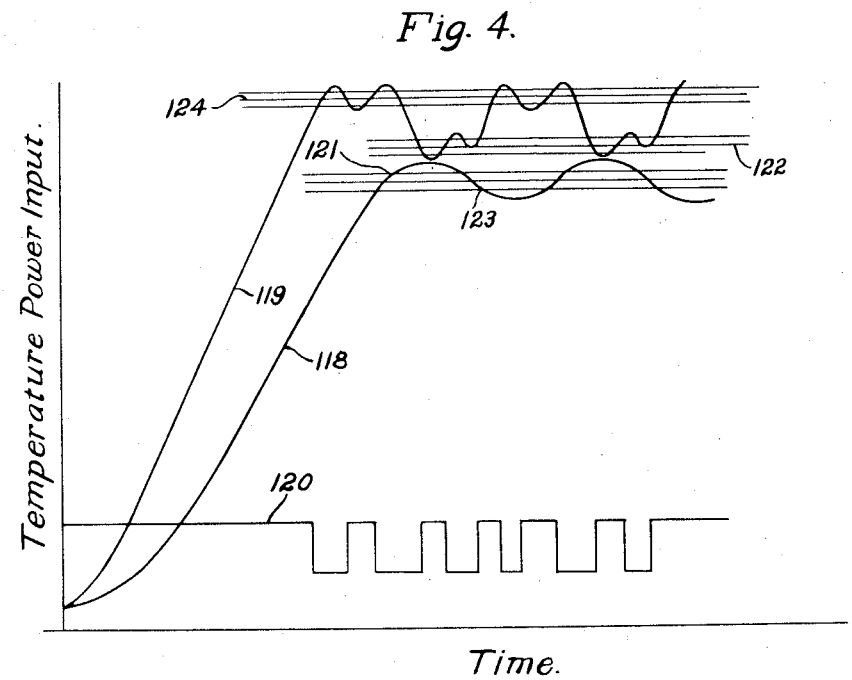
WITNESSES:
C. J. Weller.
G. B. Fjoflet
INVENTOR
Rollo B. Lincoln.
BY
Wesley G. Carr
ATTORNEY Patented Dec. 18, 1928.

1,695,853

UNITED STATES PATENT OFFICE.

ROLLO B. LINCOLN, OF WILKINSBURG, PENNSYLVANIA, ASSIGNOR TO WESTINGHOUSE ELECTRIC & MANUFACTURING COMPANY, A CORPORATION OF PENNSYLVANIA.

TEMPERATURE-CONTROL SYSTEM.

Application filed May 3, 1927. Serial No. 188,601.

My invention relates to heated devices and particularly to temperature control systems therefor.

An object of my invention is to provide a temperature control system for heated devices that shall maintain the temperature thereof substantially constant.

Another object of my invention is to provide a temperature control system that shall maintain the temperature of a heated region substantially constant.

A further object of my invention is to provide a temperature control system that shall maintain the temperature of a heated region either at one or another of a plurality of temperatures of predetermined values, in accordance with the departure from a certain temperature to be maintained in a second region heated by said first region.

Another object of my invention is to provide a temperature control system that shall cause the temperature of a region equipped with heating means to be varied inversely proportional to the temperature of a region heated thereby.

And a further object of my invention is to provide a temperature control system that shall reduce "over and under shooting," commonly known as hunting, of a desired temperature to be maintained in a region or body to be heated.

In practicing my invention, I provide a temperature control system for controlling the temperature of a region equipped with heating devices in accordance with the departure of a second region, heated by the first region, from a temperature of a predetermined value.

The temperature control system comprises in general thermo-responsive means subjected to the temperature of a region equipped with heating devices for controlling the energization of the heating means, and a second thermo-responsive means for changing the calibration of the first thermo-responsive means in accordance with the temperature of a second region heated by the first region.

If the temperature of the second region is below a predetermined value, the second thermo-responsive means so affects the operation of the first thermo-responsive means that the temperature of the region equipped with the heating means is maintained at a relatively high temperature. If the temperature of the second region increases above a predetermined value, the second thermo-responsive means, or the temperature responsive means subjected to the temperature of the second region, affects the condition of the first thermo-responsive means that the energization of the heating means, is so varied that the temperature of the first region is maintained at a lower temperature of a predetermined value.

For a fuller understanding of the circuits and apparatus embodying my invention, reference may be had to the accompanying description taken in conjunction with the drawings, in which Figure 1 is a partially diagrammatic and partially sectional view of circuits and apparatus embodying my invention.

Fig. 2 is a schematic development view of a selector switch illustrated in Fig. 1.

Fig. 3 illustrates the variations in temperature of a heated region with variations in the heat energy supplied thereto, and corresponding variations in temperature of a second region heated by the first region, the supply of heat energy being controlled only in response to the temperature of the second region, and Fig. 4 illustrates the various in temperature of a region equipped with heating means, and the corresponding variations in temperature of a second region heated by the first region, as well as the variations in the power input to the heating means, the power input being controlled in accordance with the temperature of the first region and in accordance with the departure of the first region from a predetermined temperature.

In the drawings, a refractory structure is shown comprising side and bottom walls 10, 11 and 12 for defining a chamber or region 13. A container 14 is disposed within the chamber 13 and supported by the walls 10 and 11, the container being provided with a depending body portion 15 of substantially cup-shape that defines a region 16 in which materials to be heated may be contained.

The region 13 may be equipped with heating means that consists of resistor elements 17 and 18 disposed adjacent to the walls 10 and 11. One end of the resistor 17 may be connected to a conductor 19 of a source of electric energy through a conductor 21 and a circuit interrupter 22, and one terminal of the resistor 18 may be connected to the conductor 19 by a conductor 23. The other ends of the resistors 17 and 18 may be electrically connected at 24, from which point the resistors are connected to a conductor 25 of the source of electric energy by a conductor 26. The conductors 21, 23 and 26 may be provided with line switches 27, whereby the resistors may be permanently disconnected from the supply conductors.

As is evident from Fig. 1, the resistor elements 17 and 18 will be connected in parallel when the switch mechanism 22 is in a circuit making position and when in a circuit breaking position, the resistor element 18 only is connected across the supply conductors 19 and 24. It is to be understood that the resistors may be connected in other well-known circuit arrangements if so desired.

The switch mechanism 22 is operable to a circuit breaking position by a spring 27a, the mechanism being provided with a solenoid 28 for actuating the switch mechanism into a circuit making position, the solenoid 28 being under the control of a relay 29 to be hereinafter described in detail.

In some applications of electric heat to electrically heated devices, it is desirable that the region 13, or the region in the immediate vicinity of the source of heat, be maintained at a maximum temperature conducive to long life of the heating elements and the surrounding refractory (see Figure 1) during the heating up period of the region 16, the region 16 being descriptive of materials or substances to be heated, in order that the latter region may be heated to the desired temperature in a minimum period of time. In other applications, it may be required that the region 16 be heated slowly, in which case the region 13 should be controlled at a temperature lower than the maximum during the heating up period.

In either of these applications, when the heating-up period has determined and the region 16 has been heated to a temperature of a predetermined value, the energization of the resistor elements 17 and 18, or the source of heat, is so controlled that the region 13 is maintained at a lower temperature, the heat energy supplied being only that required to compensate for radiation losses and the heat energy removed from the region 16 for performing useful work.

Generally stated, the temperature of the region 13 is controlled at a relatively high temperature of a predetermined value when the temperature of the region 16 is below a predetermined value and at a relatively low value when the temperature of the latter region is above that to be maintained.

In order that the temperature of the region 13 may be controlled in accordance with the temperature of region 16, a thermocouple 31 having a resistor 32 included in the circuit thereof, a relay 29 controlled by the thermocouple 31, a thermo-couple 33, a relay 34 controlled thereby for including more or less of the resistor 32 in the circuit of the thermocouple 31, and an instrument 35 are provided. Since one instrument only is utilized for controlling alternately the relays 34 and 29 in accordance with the condition of the thermocouples 33 and 31, a selector switch 36 is provided for recurrently connecting, first, thermo-couple 33 and then the thermo-couple 31, to the instrument 35. The selector switch operates also to connect alternately the relays 34 and 29 to the instrument 35 simultaneously or substantially so with the connection of the thermo-couples 33 and 31 to the instrument.

The thermo-couple 33 comprises conductors 37 and 38 joined together in the usual manner, the hot junction thereof being located in the region 16 and the cold junction in a body 39 of constant temperature.

The conductors 37 and 38 may be made from alloys suitable for use in thermocouples.

The thermo-couple 31 comprises conductors 41 and 42 joined together in the usual manner, the hot junction being located in the region 13 and the cold junction in the body 39. As shown in Fig. 1 of the drawings, the resistor 32 may be connected in series with the conductor 42.

When all of the resistor 32 is included in the circuit of the thermo-couple 31, a portion of the electromotive force generated at the hot junction of the thermo-couple is consumed thereby, and, if a portion of the resistor 32 is shunted out of the circuit of the thermo-couple 31, less of the electromotive force generated at the hot junction is consumed in the resistor 32. Therefore, if an instrument for indicating temperatures be connected to the thermo-couple 31 when all of the resistor 32 is included in the circuit thereof, the instrument will indicate a temperature proportional to that of the hot junction and if a portion of the resistor be shunted out of the thermo-couple circuit, the instrument will indicate a temperature higher than the former. Therefore, the resistor 32 may be so controlled that the calibration of the thermo-couple 31 may be changed in accordance with the temperature of the region 16 by including more or less of the resistor 32 in its circuit.

The instrument 35 may be of the dynamometer type, and as schematically shown in the drawings, it comprises a coil 43 pivotally mounted on shafts 44 and 45 and disposed between poles 46 and 47 of a permanent magnet. The shaft 44 is provided with a movable contact arm 48 for engaging either one or the other of adjustable stationary contacts 49 and 50. The shaft 45 is provided with a spring 51 for biasing the contact arm 48 towards the stationary contact 49.

The relay 29 comprises a coil 55, resistor elements 56 and 57 connected together in series and in shunt with the coil and resistor elements 58 and 59 connected in series circuit with the coil and the resistors 56 and 57. One end of the resistor 58 is connected to the conductor 19 of the supply circuit and the other end thereof is connected to common connection between the coil and the resistor 56. One end of the resistor 59 is connected to the conductor 25 of the supply circuit and its other end is connected to the common connection between the coil and the resistor 57. Thus, it is seen that the relay 29 may be permanently connected to and energized from the supply conductors 19 and 25.

The coil 55 is provided with an armature 61 having contact bridging members 62 and 63 carried thereby for bridging pairs of stationary contacts 64 and 65, respectively. One of the contacts 64 is connected between the resistor elements 57 and 59 and the other contact is connected to the conductor 25, so that the resistor 59 may be shunted out of the circuit of the relay 29 when the bridging member 62 bridges the stationary contacts 64.

One of the contacts 65 is connected to the supply conductor 25 and the other is connected to one terminal of the solenoid 28 by a conductor 66, the other terminal of the solenoid being connected to the supply conductor 19 by a conductor 67. When the relay 29 is energized, the armature 61 is attracted to that position in which the contact bridging members 62 and 63 engage the stationary contacts 64 and 65, respectively. When in this position, the solenoid 28 is energized, causing the switch mechanism 22 to be actuated to a circuit making position.

The relay 29 may be energized by so short circuiting the resistor element 59 that the supply conductor 25 is connected between the resistor elements 57 and 59. With the resistor 59 thus short circuited, the current through the coil 55 is caused to increase to such a value that the armature 61 is attracted to the position illustrated by the full lines in Fig. 1 of the drawings.

In order to deenergize the relay, the current through the coil 55 must be reduced. This may be accomplished by short circuiting the resistor element 57, thereby causing current to be shunted around the coil, the result being that the armature 61 is released to the position illustrated by the broken lines. When in the released position, the resistor 59, is again included in the circuit of the relay, and the circuit of the solenoid 28 of the switch mechanism 22 is caused to be interrupted to effect a release of the latter to a circuit breaking position.

The relay 34 comprises a coil 68 having resistor elements 69 and 71 connected in parallel circuit therewith and resistor elements 72 and 73 connected in series circuit with the resistors and the coils 68. One end of the resistor 73 is connected to the supply conductor 19 and the other end thereof connected to a common connection between the coil and the resistor 69. One end of the resistor 72 is connected to the supply conductor 25 and its other end is connected to the common connection between the coil and the resistor 71.

The coil 68 may be provided with an armature 74 having contact bridging members 75 and 76 carried thereby for engaging pairs of stationary contact members 77 and 78, respectively.

As shown, one of the contacts 77 is connected to one end of the resistor 72 and the other of the contacts is connected by a conductor 79 to a conductor 81 to which the other end of the resistor 72 is connected also. Thus. if the stationary contacts 77 are bridged by the bridging member 75, the resistor 72 is shunted out of the circuit of the relay 34 to maintain the relay in an energized condition. When the relay 34 is deenergized, the armature 74 is released, thereby causing the bridging member 76 to bridge the contacts 78 and to short circuit a portion of the resistor 32, the contact members 79 being connected to a portion of the resistor 32 by conductors 82 and 83, respectively. The conductor 83 may be connected at various points along the resistor 32 in order that a predetermined amount of the resistor may be shunted out of the thermo-couple circuit depending upon the temperature to be maintained in the region 13.

The relay 34 being similar in construction and operation to the relay 29, it is necessary merely to state that the relay may be energized when the resistor 72 is shunted out of the relay circuit and deenergized when the resistor 71 is short circuited.

The selector switch 36, previously mentioned herein, is illustrated as being of the drum type and comprises a cylinder 84 carried by shaft 85 that is journaled in bearings 86. The cylinder 84 may be rotated by means of a motor 87 mechanically connected to the shaft 85 and electrically connected for energization to the supply conductors 19 and 25. The motor may be provided with any well known speed reduction mechanism if it is so desired in order that the cylinder may be driven at a low speed relatively to the speed of the motor.

The cylinder 84 may be provided with a plurality of contact rings 88 to 92, inclusive. The rings 88 and 89 being provided with portions 93 extending to the left and portions 94 extending to the right of a central portion that encircles the cylinder, (see Fig. 2). Likewise, the rings 91 and 92 may be provided with portions 95 and 96 extending to the left and the right respectively of a central portion that encircles the cylinder.

The rings 88 to 92, inclusive, make contact with brushes 97 to 100 so supported above the top of the cylinder 84 as to make contact with the central portion of the rings. A plurality of brushes 101 to 108, inclusive, are provided along the bottom edge of the cylinder, the brushes being so disposed as to make contact with the left and the right hand portions of the rings 88 to 92 respectively.

As is shown more clearly in Figure 2, the brushes 101 and 103 make contact with the left hand portions of the rings 88 and 89 before contact between the brushes 105 and 107 and the left hand portions of the rings 91 and 92 takes place. Likewise, the brushes 102 and 104 make contact with the right hand portions of the rings 88 and 89 before the brushes 106 and 108 have made contact with the right hand portions of the rings 91 and 92.

As shown, in Fig. 1 of the drawings, the conductors 37 and 38 of the thermo-couple 33 are connected to the brushes 101 and 103, respectively, the conductors 41 and 42 of the thermo-couple 31 are connected to the brushes 102 and 104 and the brushes 97 and 98 are connected by conductors 109 and 110 to the coil 43 of the instrument 35. Therefore, assuming that the cylinder 84 be rotating in a counterclockwise direction as viewed from the right, the thermo-couples 33 and 31 are connected alternately to the coil 43.

The stationary contact 49 of the instrument 35 is connected by a conductor 111 to the end of the resistor element 59 of the relay 29 that is connected to the supply conductor 25. The contact 49 is connected also to the end of the resistor 72 of the relay 34 by the conductor 111 and a conductor 112. The removable contact 48 may be connected to the brush 99 of the selector switch 35 and the stationary contact 50 to the brush 100.

The brush 108 of the switch may be connected to the connection point between the resistor elements 57 and 56 of the relay 29 by a conductor 113, and the brush 107 may be connected to the connection point between the resistors 69 and 71 of the relay 34 by a conductor 114. The brush 106 of the selector switch is connected by a conductor 115 to the connection point between the resistors 57 and 59 of the relay 29 and the brush 105 is connected by a conductor 116 to the connection point between the resistors 71 and 72 of the relay 34.

When the contact arm 48 engages the stationary contact 49, and the left hand portions of the rings 91 and 92 make contact with the brushes 105 and 107, the resistor 72 of the relay 34 is short circuited to thereby effect energization thereof as previously set forth herein. With the contacts 48 and 49 still in engagement and the right hand portions of the rings 91 and 92 making contact with the brushes 106 and 108, the resistor element 59 of the relay 29 is short circuited, thereby effecting energization thereof as previously mentioned herein.

The moment that either of the relays 29 or 34 is energized, the resistors 59 and 72 are short circuited by the bridging of the stationary contacts 64 with the bridging member 61 and the stationary contacts 77 with the bridging member 75. Therefore, the contacts 48 and 49 are relieved from further current carrying duty.

When the movable contact 48 engages the stationary contact 50 and the left hand portions of the rings 91 and 92 make contact with the brushes 105 and 107, the resistor 71 of the relay 34 is short circuited, causing the relay to be deenergized for the reason previously stated herein. With the contacts 48 and 50 still in engagement, but with the right hand portions of the rings 91 and 92 engaging the brushes 106 and 108, the resistor 57 of the relay 29 is short-circuited whereby deenergization of the relay is effected.

It is to be noted that the relay 34 may be connected to the instrument 35 only when the thermo-couple 33 is connected to the coil 43, and that the relay 29 is connected to the instrument only when the thermo-couple 31 is connected to the coil 43 through the selector switch.

In order to best understand the operation of the temperature control system illustrated in Figure 1, reference should be had to the curves in Figure 4 of the drawings. The curves 118, 119 and 120 there illustrated, represent the temperature-time and the power-input-time characteristics of the regions 13, 16 and the resistors 17 and 18. Assuming that the region 16, or such materials as solder, lead, etc., contained therein, is being heated from a solid or a frozen state, to molten condition, full power will be applied to the heating units, that is, the resistors 17 and 18 are connected in parallel across the supply conductors 19 and 25. The temperature of the region being below that desired to be maintained therein, the contacts 48 and 49 will be in engaged position and the relays 34 and 29 caused to be energized as hereinbefore set forth. The temperature of the region 13 will then be increased to a relatively high value, the entire resistance 32 being included in the circuit of the thermo-couple 31, and will be controlled at this temperature, the contact 48 being actuated intermittently between the contacts 49 and 50 in response to the temperature of the couple 31 to effect energization and deenergization of the relay 29 with the consequent opening and closing of the switch 22.

As illustrated by the curves, the temperature of the region 13 will follow the curve 119 and the temperature of the region 16 will follow the curve 118.

When the temperature of the region 16 reaches the value indicated by the point 121 on the curve 118, the relay 34 will be caused to be deenergized and a portion of the resistor 32 short circuited, thereby causing the region 13 to cool to and to be controlled at an average temperature indicated by an horizontal line 122 extending through a portion of the curve 119. With the region 13 controlled at this temperature the region 16 will cool gradually until it reaches the point 123 on the curve 118 at which temperature the relay 34 is again caused to be energized to include all of the resistor 32 in the circuit of the thermo-couple 31. In this case the relay 29 will be so controlled that the temperature of the region 13 is again controlled at its upper limit as indicated by an horizontal line 124 extending through the upper portion of the curve 119.

The region 13 will then be controlled at this value until the temperature of the region again reaches the value indicated by the point 121 on the curve 118. This sequence of operation being continued, a uniform average temperature may be obtained in the region 16, the maximum and minimum values of which do not depart widely therefrom.

It is to be understood that so long as the temperature of the region 16 is at or above the average temperature, the electromotive force generated by the thermo-couple 33 will be sufficient to actuate the movable contact 48 into engagement with the stationary contact 50 to thereby maintain the relay 34 in a deenergized condition and to cause the thermo-couple 31 to control the region 13 at an average temperature indicated by the line 122 extending through a portion of the curve 119.

When the temperature of the region 16 is below the average temperature to be maintained, the electromotive force of the thermo-couple 33 is of insufficient value to overcome the torsion of the spring 51 so that the movable contact 48 is caused to engage the stationary contact 49. The relay 34 is, therefore, caused to be energized and all of the resistor 32 connected into the circuit of the thermo-couple 31, whereby the region 13 is caused to be controlled at a temperature indicative of the ordinate to the line 124 extending through the upper portion of the curve 119.

In Fig. 3 of the drawings are illustrated comparative curves representing the temperature characteristics of the regions 13 and 16 and the power-input-time curve for the resistor heating elements, the temperature of the region 16 being controlled only by means of one thermo-couple located in the region 16.

In Fig. 3, curve 125 represents the temperature characteristics of the region 13, curve 126 the temperature characteristics of the region 16 and curve 127 represents the power-input-time curves to the resistor elements 17 and 18. As there shown, when the temperature of the region 16 reaches the value represented by the ordinate of a line 128 extending through the curve 126, the power-input to the heating elements is reduced. But the temperature of the heating elements and the surrounding refractory being very high, the temperature of the region 16 will continue to increase even though the temperature of the region 13 has begun to decrease.

When the temperature of the region 13 has fallen to a predetermined temperature, the temperature of the region 16 commences to fall accordingly and when it reaches the line 128, the power input to the heating elements is again increased. But the temperature of the region 16 continues to fall for the reason that the temperature of the chamber or the region 13 is below the value at which heat will flow from this region to the region 16.

Thus, when the source of heat is controlled only in accordance with the temperature of the region 16 the temperature of the regions 13 and 16 is caused to fluctuate between relatively high and low values with the result that the temperature of the region 16 is not so uniform as when the temperatures of both the regions are controlled, the one region in accordance with the other.

Various modifications may be made in the system and apparatus embodied in my invention without departing from the spirit and the scope thereof. I desire, therefore, that only such limitations shall be placed thereon as are imposed by the prior art and the appended claims.

I claim as my invention:

1. In a temperature control system, the combination with a medium, a heating means therefor, a body disposed in the medium to be heated, a thermo-couple subjected to the temperature of the medium and means actuable thereby for controlling the energization of the heating means, of means responsive to the temperature of the body for varying the resistance of a thermo-couple circuit when said body departs from a temperature of a predetermined value.

2. In a temperature control system, the combination with a medium, heating means therefor, a body disposed in the medium to be heated, a thermo-couple subjected to the temperature of the medium and means actuable thereby for controlling the energization of the heating means, of thermo-couple means responsive to the temperautre of said body for varying the resistance of the circuit of the first thermo-couple when the temperature of said body departs from a predetermined value.

3. In a temperature control system, the combination with a medium, heating means therefor, a body disposed in the medium to be heated thereby, a thermo-couple subjected to the temperature of said medium, means responsive to the E. M. F. of the thermo-couple for controlling the energization of the heating means and a resistor connected in circuit with said thermo-couple, of thermo-responsive means subjected to the temperature of said body and means actuable thereby for short circuiting said resistor when the temperature of said body exceeds a certain predetermined value.

4. In a temperature control system, the combination with a medium, heating means therefor, a body disposed in the medium to be heated thereby, a thermo-couple subjected to the temperature of said medium, means responsive to the E. M. F. of the thermo-couple for controlling the energization of the heating means and a resistor connected in circuit with said thermo-couple, of a thermo-couple subjected to the temperature of said body and means actuable thereby for short circuiting said resistor when the temperature of said body exceeds a certain predetermined value.

5. In a temperature control system, the combination with a medium, heating means therefor, a body disposed in the medium to be heated thereby, a thermo-couple subjected to the temperature of said medium, means responsive to the E. M. F. of the thermo-couple for controlling the energization of the heating means and a resistor connected in circuit with said thermo-couple, of a thermo-couple subjected to the temperature of said body and means actuable thereby for short circuiting said resistor when the temperature of said body exceeds a certain predetermined value and for including said resistor in the circuit of said first thermo-couple when the temperature recedes from said predetermined value.

6. In a temperature control system, the combination with heating means, a chamber heated thereby, a body heated by said chamber, a thermo-couple subjected to the temperature of said chamber and means actuable thereby for controlling the energization of said heating means, of means responsive to the temperature of said body for causing the thermo-couple to selectively maintain said chamber at one of a plurality of temperatures of predetermined values, in accordance with the departure of temperature of said body from a predetermined value.

7. In a temperature control system, the combination with heating means, a chamber heated thereby, a body heated by said chamber, temperature responsive means disposed in said chamber, and means actuable thereby for controlling the energization of said heating means, of means responsive to the temperature of said body for causing the temperature responsive means to selectively maintain said chamber at one or the other of a plurality of temperatures of predetermined values in accordance with the departure of the temperature of said body from a predetermined value.

8. The combination with a control instrument actuable to a plurality of positions, a plurality of thermo-couples and means for alternately connecting said thermo-couples to said control instrument, of a resistor and means actuable by one of said thermo-couples for including more or less of said resistor in the circuit with another of said thermo-couples in accordance with the departure of one of said thermo-couples from a temperature of a predetermined value.

9. The combination with a chamber, resistor heating means therefor, and thermo-couple controlled means for varying the energization of said resistor elements to thereby regulate the temperature of said chamber, of means responsive to the thermal condition of a body heated in said chamber for causing said thermo-couple controlled means to maintain the chamber temperature at one value when that of the body is of a maximum desired value, and to maintain said chamber at another value when the temperature of the body is of a minimum desired value.

In testimony whereof, I have hereunto subscribed my name this 28th day of April, 1927.

ROLLO B. LINCOLN.